Feb. 9, 1971 J. J. BUNDSCHUH 3,561,854
APPARATUS FOR MONITORING REWIND IN A MOTION PICTURE PROJECTOR
Filed Dec. 22, 1967 3 Sheets-Sheet 1

JOHN J. BUNDSCHUH
INVENTOR.

BY
ATTORNEYS

Feb. 9, 1971   J. J. BUNDSCHUH   3,561,854
APPARATUS FOR MONITORING REWIND IN A MOTION PICTURE PROJECTOR
Filed Dec. 22, 1967   3 Sheets-Sheet 2

JOHN J. BUNDSCHUH
INVENTOR.

BY

ATTORNEYS

Feb. 9, 1971  J. J. BUNDSCHUH  3,561,854
APPARATUS FOR MONITORING REWIND IN A MOTION PICTURE PROJECTOR
Filed Dec. 22, 1967  3 Sheets-Sheet 3

JOHN J. BUNDSCHUH
INVENTOR.

BY

ATTORNEYS

United States Patent Office 3,561,854
Patented Feb. 9, 1971

3,561,854
APPARATUS FOR MONITORING REWIND IN A MOTION PICTURE PROJECTOR
John J. Bundschuh, Rochester, N.Y., assignor to Eastman Kodak Company, Rochester, N.Y., a corporation of New Jersey
Filed Dec. 22, 1967, Ser. No. 692,814
Int. Cl. G03b 23/00
U.S. Cl. 352—124                           3 Claims

ABSTRACT OF THE DISCLOSURE

A rewind mechanism for a motion picture projector includes a control mechanism for regulating a drive for transporting film through a motion picture projector. A stream of air or other gas under pressure is carried by the projector and directed toward a sensing device. The film is transported between the air supply and the sensing device so that perforations in a side edge of the film and the portions of film between the perforations alternatey permit and block movement of air from the supply to the sensing device. The sensing device is coupled to the control means so that the drive for the film is controlled as a function of the output of the sensing device.

BACKGROUND OF THE INVENTION

The present invention relates to rewinding apparatus, and more specifically to an automatic rewind mechanism for a motion picture projector or the like.

To simplify the use of motion picture projectors or the like, considerable attention has been directed toward providing means whereby such apparatus can be loaded with a cartridge containing a reel from which the film can be removed, threaded, projected, and then rewound automatically.

Such a cartridge-loading projector system, which will also accept standard unenclosed reels, is disclosed in commonly assigned copending U.S. patent application Ser. No. 685,616, entitled Cinematographic Projectors or the Like and Cartridges for Use Therewith, filed in the names of John J. Bundschuh et al. on Nov. 24, 1967. In the system disclosed in said application, a film reel may be positioned within a cartridge which can be latched to the projector. An opening in the side of the cartridge is adapted to receive a projector spindle for supporting the reel in operative position within the cartridge.

With the cartridge positioned on the projector, film on the reel is radially accessible to a stripping mechanism which is movable into temporary operative relationship with the film through a slot in the lower portion of the cartridge; such mechanism being adapted to separate the leading end of the film from the roll and to feed it along a predetermined threading path. Upon completion of the projection cycle, a rewind mechanism initiates a rewind cycle whereupon the gate is opened, the pull-down claw is retracted, and the film is rapidly rewound back through the gate and onto the supply spool.

The projector and the rewind mechanism described in said application have proved quite satisfactory in use. However, during rewinding of film onto the supply reel the angular velocity of the supply reel remains constant throughout the rewinding cycle of operation. As a result, the instantaneous linear velocity of film through the projector gate (and at other points along the film path between the reels) depends on the effective diameter of the film roll on the supply reel, and such varies continuously throughout the rewinding cycle of operation. This may not be fully satisfactory under certain operating conditions. For example, if the angular velocity of the supply reel is regulated so that linear velocity of film is maintained at a satisfactory level during final stages of rewinding of relatively large rolls, then too much time may be required for rewinding relatively small film rolls. On the other hand, if the angular velocity of the supply reel is high enough for rewinding relatively small film rolls within a desired short time interval, then high linear film velocities are encountered during the final stages of rewinding of relatively large film rolls, and such may produce damage to the film as it is driven through the projector film gate. To some extent this same problem is encountered when the projector accepts a film roll containing a given length of film with one film thickness and then accept another film roll containing the same length of film but with a different film thickness.

SUMMARY OF THE INVENTION

The principal object of the present invention is to provide an improved automatic rewind system mechanism for a motion picture projector wherein the rotational speed of the supply reel during rewind is varied according to the diameter of film wound thereon. One embodiment of the invention which is disclosed in connection with a cartridge loading projector of the type described in the aforementioned application Ser. No. 685,616, includes means for directing a stream of air under pressure toward a film path and in alignment with a longitudinal edge portion of film from one side of the film path to generate at the other side of such film a plurality of energy pulses. These pulses are sensed, and the drive for film through the projector is controlled as a function of such sensing.

GENERAL DESCRIPTION

Figure 1:
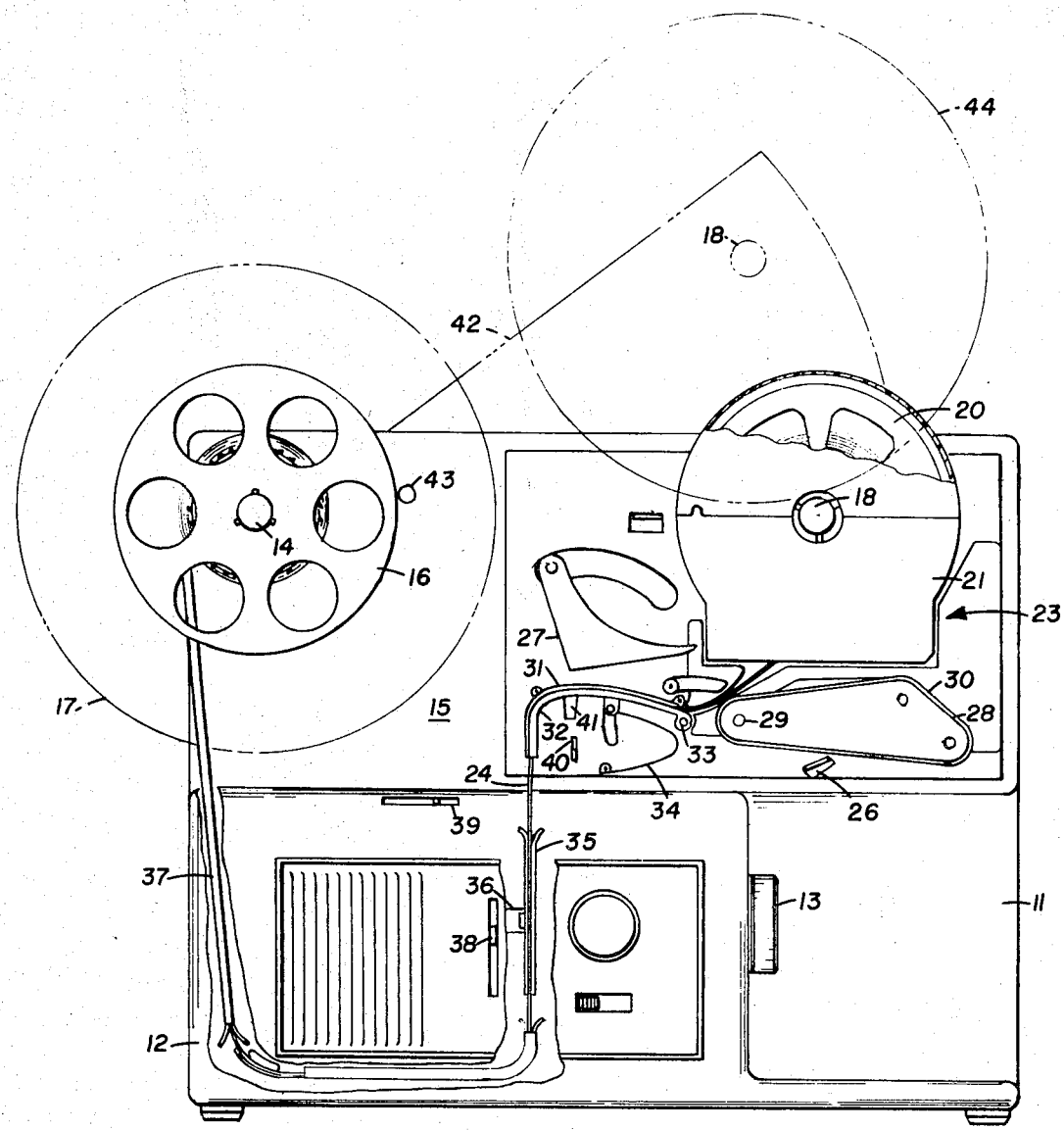
FIG. 1 is a side elevational view of a projector adapted to accommodate either a cartridge containing a film reel or an unenclosed film reel.
Figure 2:
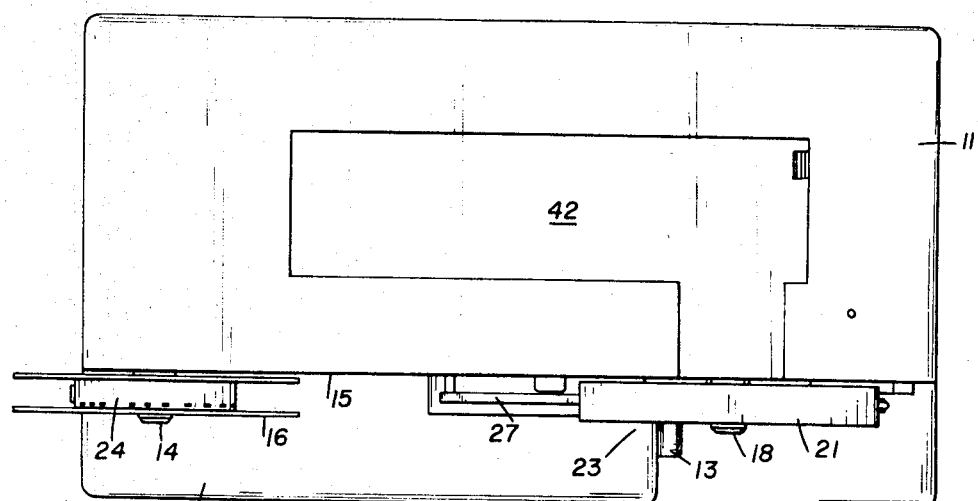
FIG. 2 is a top plan view of the projector shown in FIG. 1.
Figure 3:
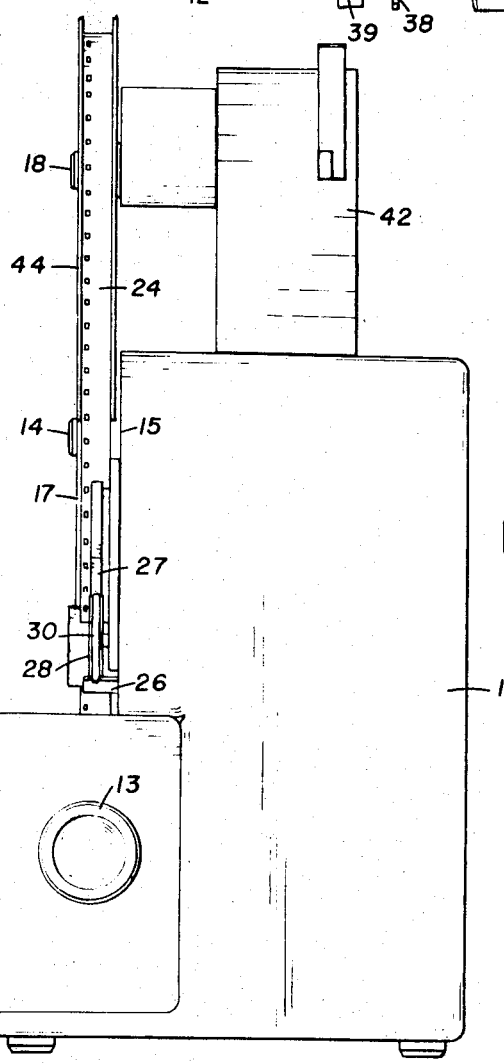
FIG. 3 is a front elevational view of the projector illustrated in FIGS. 1 and 2, showing an unenclosed film supply reel supported by a spindle carried by an arm.

As previously mentioned, an automatic threading projection and rewind projector of the type in which the present invention may be incorporated, is disclosed in application Ser. No. 685,616, filed on Nov. 24, 1967, by Bundschuh et al. Certain features of such a projector are shown in FIGS. 1–3, and comprise casing member 11 including a housing 12 which supports light source L (shown in FIG. 4) and a forwardly facing projection lens assembly 13. Above housing 12, rotatable take-up reel drive member or shaft 14 extends beyond vertical wall member 15 in coaxial alignment with a corresponding pulley member (not shown), which rotates constantly in a clockwise direction during operation of the projector. Drive member 14 is adapted to receive either a relatively small film take-up reel, as shown at 16 in FIGS. 1 and 2, or a larger take-up reel shown at 17 in broken lines in FIG. 1. A similar rotatable drive member or spindle 18 likewise extends beyond wall member 15 in coaxial alignment with another pulley member (not shown) which is rotatable in a counterclockwise direction during selected cycles of operation of the projector.

Reel drive member 18 is adapted to receive a film reel 20, housed within a cartridge 21 loaded onto the projector as shown at 23. To accommodate the film 24 supplied by such a cartridge, the film take-up reel 16 can have a film capacity generally equivalent to the film capacity of the cartridge as shown in FIG. 1 or may be of larger film capacity if desired.

As disclosed in copending application Ser. No. 685,616, the film cartridge 21 may be releasably latched in place on the projector with the cartridge reel in coaxial driving engagement with drive member 18. To remove film from the cartridge, the operator manually depresses ear 26 to a position in which it is releasably retained by a latch mechanism as described in said copending application. This causes a stripper finger 27 to enter a slotted base portion of the cartridge and thereafter moves a stripper belt member 28 in a counterclockwise direction about shaft 29 to bring stripper belt 30 into contact with the periphery of the roll of film on the film supply spool.

The stripper belt 30 is constantly driven in a counterclockwise direction as shown on FIG. 1. Therefore, its peripheral engagement with the film supply roll rotates the film roll in a clockwise direction. Accordingly, the leading end of the film is separated from the roll by the stripper finger and is delivered out of the cartridge through a narrow guide path defined between a portion of the stripper belt and an adjacent edge of the stripper finger.

As the leading end of the film emerges beyond the path defined between the stripper belt and the stripper finger, it enters a curved guide channel established between a stationary film guide member 31 and a movable snubber member 32, the latter being pivotable downwardly about pin 33 but biased into resilient engagement with guide member 31 by spring 34. This curved guide channel directs the leading end of the film downwardly into the projection gate 35 where it is engaged by the film advancing mechanism 36 of the projector, and advanced intermittently past a projection position aligned with the projector's lens assembly 13. Beyond the film gate 35, the leading end of the film proceeds into a pivotally supported channel member 37 which guides the film into contact with the hub of the take-up reel. As is well known in the projector art, the hub of the take-up reel may be provided with a plurality of teeth adapted to engage the edge perforations in the film, whereby the film is automatically attached to the hub upon being brought into contact therewith.

When the film has been engaged by the film advancing mechanism, its presence at a predetermined location is detected by an appropriate sensing device which then allows ear 26 to return to its initial position, thereby initiating the projection phase of the operating cycle. This causes the stripper finger and the stripper belt members to retract from the cartridge to their respective positions shown in FIG. 1.

As the film is being projected, it can be stopped and displayed in reverse by manually moving control lever 38 from its illustrated raised (forward) position to an extreme downward (reverse) position. Additionally, the projector is provided with a review mechanism by means of which the operator can rewind and then reproject any desired portion of the film by manually moving control lever 39 to a rearward position to temporarily actuate the film rewinding mechanism.

Considering now the rewind mechanism in more detail, the inner end of the roll of film 24 on the film supply reel within the cartridge is attached to the core of the reel. Therefore, when all of the available film has been unwound from the cartridge, the resulting tightening of the film between the gate and the spool causes the snubber member 32 to pivot downwardly to a position in which trigger lever 40 is engaged and depressed by shoe member 41 on the snubber member. Such depression of the trigger member initiates the rewind phase of the projector's operating cycle by opening the gate and withdrawing the film pulldown claw therefrom, by establishing positive rewinding rotation of drive member 18, and by releasing drive member 14 from the corresponding pulley member to allow the take-up reel to rotate freely as film is unwound therefrom. Thus, the film is automatically rewound entirely into the cartridge through the film gate, whereupon the rewound cartridge can be removed from the projector.

As further disclosed in application Ser. No. 685,616, the spindle 18 may be rotatably suported on a movable arm 42 which is pivotally mounted on the projector housing by a pivot shaft 43. The arm 42 is pivotable between the lower position shown in solid lines in FIGS. 1 and 2 and the upper position shown in broken lines in FIG. 1 and solid lines in FIG. 3. In the upper position of the arm 42 an unenclosed reel 44 may be supported on the spindle 18 and threading accomplished manually in the manner described in said copending application. Suitable coupling means (not shown) described in detail in said copending application may be provided to couple the spindle 18 to a drive means within the projector housing.

If, during the rewind mode of operation the supply reel is driven by the spindle 18 at a constant angular velocity, the film will move through the projection gate 35 at a constantly variable velocity dependent on the effective diameter of the film roll on the supply spool. It will be apparent that if the roll has a relatively small effective diameter, such as at the start of the rewind cycle, the linear film velocity at the gate will be relatively low. On the other hand, if the film roll has a relatively large effective diameter, such as at the end of the rewind cycle, the linear film velocity at the gate will be relatively high. A similar relationship will exist with respect to small and large capacity film reels (e.g. 50 and 400 foot reels) and with respect to thin and thicker films.

Figure 4:
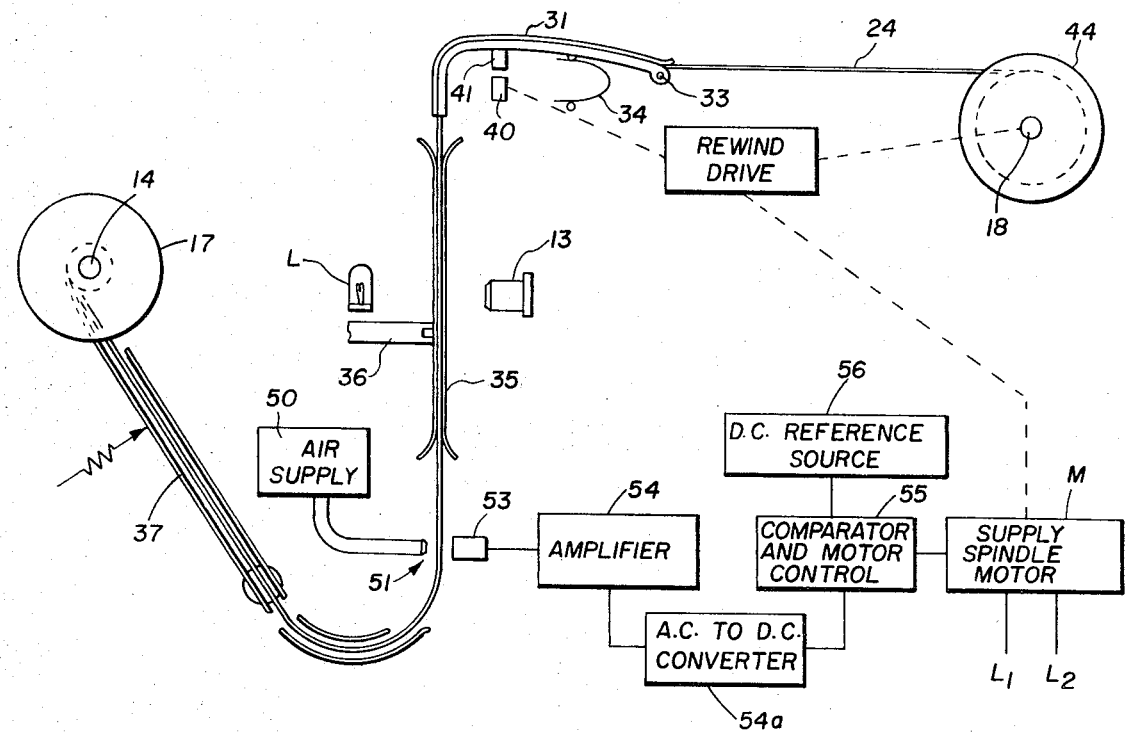
FIG. 4 is a schematic view of an embodiment of the present invention showing the means for sensing and controlling the linear speed of film during a rewind cycle of a motion picture projector.

In accordance with the present invention, means are provided for adjusting the angular rewind velocity of the spindle and take-up reel to avoid changes in linear film velocity from variations in the effective diameter of the film roll. Referring to FIG. 4 of the drawings, there is disclosed schematically an embodiment of the present invention wherein a film path is shown as it would appear during both the projection and the rewind cycles of a motion picture projector in accordance with the system disclosed in copending application Ser. No. 685,616. An energy emitting means such as an air supply 50 and an air jet 51 are positioned along the film path in such a manner that the air stream from jet 51 will be interrupted by the usual film perforations which are engaged by pull down claw 36. In this manner, an audible sonic vibration frequency will be produced as a result of the periodic interruption of the air stream by the film perforations, said frequency being dependent upon the number of interruptions of the air stream per unit of time, which in turn will be dependent on the linear velocity of the film relative to the air stream.

On the other side of the film path, but in close proximity to the air jet 51, an energy receiving means such as a microphone 53 is located to receive or sense the audible frequency produced by jet 51 and the film perforations. Since this audible frequency depends upon the linear velocity of the film at the air jet, the microphone output will be related to the linear film velocity. This frequency signal picked up by microphone 53 is increased in intensity by amplifier 54 and is then converted to a direct current by an A.C.-to-D.C. converter 54a. The resulting signal is fed into a comparator and motor control circuit 55, which simultaneously receives a reference signal from D.C. reference source 56. Comparator and motor control 55, which may take the form of a bridge circuit, compares the amplified signal from converter 54a with the reference signal and de-energizes supply spindle motor M whenever the amplified signal equals or exceeds the reference signal. On the other hand, when the amplified signal drops below the reference signal, motor control 55 again energizes motor M. In this manner, the linear speed with which film passes through gate 35 is regulated and maintained below a maximum predetermined limit which is set by adjustment of input reference 56.

It should be apparent to those skilled in the art that a similar monitoring means could employ a light source in the place of air jet 51 and a photocell instead of microphone 53.

Figure 5:
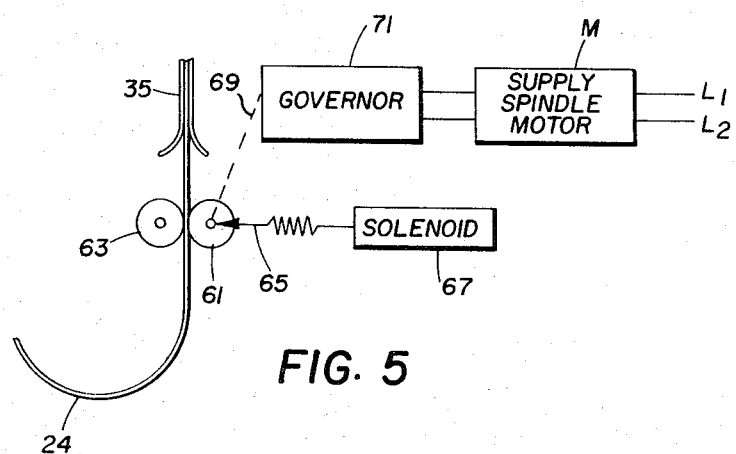
FIG. 5 is a partial schematic view similar to FIG. 4 but showing a different embodiment of the present invention.

Referring now to FIG. 5 of the drawings, there is shown a second embodiment of the invention in which a sensing roller 61 is urged against the film 24 and a second roller 63 by means of spring 65 and solenoid 67. In order to minimize wear on the film, solenoid 67 may be actuated during the rewind cycle only, and the engagement between rollers 61, 63 and the film may be along the edge of the film where there is no picture. Rotary motion from roller 61 is transferred by gear or belt means diagrammatically shown at 69 to a speed sensing and control means such as centrifugal governor 71, which in turn controls the speed of motor M by de-energizing the motor whenever roller 61 and governor 71 sense a linear film speed in excess of a predetermined maximum limit and by again energizing the motor when the film speed falls below such limit.

The invention has been described in detail with particular reference to preferred embodiments thereof, but it will be understood that variations and modifications can be effected within the spirit and scope of the invention as described hereinabove and as defined in the appended claims.

I claim:

1. In a motion picture projector having a supply reel and a take-up reel, and drive means for moving film along a path between the supply reel and the take-up reel, the film having a plurality of equally spaced perforations along one longitudinal side edge portion thereof, and the drive means being effective for moving film from the supply reel to the take-up reel during a projection cycle of operation and from the take-up reel to the supply reel during a rewind cycle of operation, the improvement comprising:

means carried by the projector for generating a stream of air under pressure and for directing the same toward the film path for engagement with said one side edge portion of the film from one side of the film path thereby to produce signal pulses the frequency of which is dependent on the linear velocity of the film past the stream of air;

sensing means carried by the projector for sensing the signal pulses; and control means coupled to said sensing means and to the projector drive means for regulating the drive means during the rewind cycle in response to the signal pulses sensed by said sensing means.

2. In a motion picture projector as set forth in claim 1 wherein said sensing means comprises a microphone; and said means for regulating the drive means comprises a reference signal generator and a comparator coupled to said signal generator and to said microphone, said comparator being coupled to the projector drive means and being operable to provide a signal to the drive means that is a function of (1) the linear velocity of the film as sensed by the microphone and (2) the reference signal.

3. In a motion picture projector for projecting a length of film having along one longitudinal side edge portion of the film a plurality of substantially equally spaced perforations through the film separated by imperforate film portions, the projector comprising drive means for transporting such film from a supply reel to a take-up reel along a film path, the improvement comprising:

means carried by said projector for directing a stream of fluid under pressure toward said film path in alignment with said longitudinal side edge portion of the film from one side of the film path thereby to generate at the other side of the film a plurality of fluid pulses produced by fluid alternately passing through the perforations in the film and being blocked by the imperforate portions of the film, sensing means carried by the projector and located with respect to said film path and with respect to the last said means for sensing said fluid pulses and for providing an output indicative of the fluid pulses; and control means coupled to said sensing means and to the drive means for said projector for controlling the drive means as a function of the output of said sensing means.

References Cited
UNITED STATES PATENTS

| | | | |
|---|---|---|---|
| 1,304,565 | 5/1919 | Henderson | 352—124UX |
| 1,944,035 | 1/1934 | Proctor | 352—124 |
| 2,009,442 | 7/1935 | Foster et al. | 352—124 |
| 3,159,841 | 12/1964 | Castedello et al. | 352—124OX |
| 2,013,350 | 9/1935 | Leventhal | 352—119 |
| 2,843,006 | 7/1958 | Tyler | 352—109 |

JOHN M. HORAN, Primary Examiner

M. H. HAYES, Assistant Examiner

U.S. Cl. X.R.

352—92, 180